United States Patent [19]
Farrall

[11] 3,902,565
[45] Sept. 2, 1975

[54] ELECTRIC CONVERSION FOR AUTOMOBILES

[76] Inventor: Arthur W. Farrall, 1858 Cahill Dr., East Lansing, Mich. 48823

[22] Filed: Jan. 14, 1974

[21] Appl. No.: 433,365

[52] U.S. Cl. .............................. 180/65 R; 318/139
[51] Int. Cl.² .................... B60L 11/18; B60L 15/22
[58] Field of Search ........ 180/65 R, 65 A, 65 F, 60; 318/139

[56] References Cited
UNITED STATES PATENTS

| | | | |
|---|---|---|---|
| 1,017,150 | 2/1912 | Holme | 318/263 |
| 1,179,407 | 4/1916 | Decker | 180/65 R |
| 2,586,273 | 2/1952 | Steven | 180/65 R X |
| 3,190,387 | 6/1965 | Dow | 180/65 R |
| 3,219,137 | 11/1965 | Appleton | 180/65 R X |
| 3,241,019 | 3/1966 | Gross | 180/65 R X |
| 3,300,698 | 1/1967 | Bopp et al. | 318/139 |
| 3,514,681 | 5/1970 | Dorn et al. | 180/65 R X |
| 3,517,290 | 6/1970 | Gunsser | 318/332 |
| 3,566,985 | 3/1971 | Triplett | 180/65 R X |

*Primary Examiner*—David Schonberg
*Assistant Examiner*—Milton L. Smith
*Attorney, Agent, or Firm*—Miller, Morriss, Pappas & McLeod

[57] ABSTRACT

A conversion for gasoline powered vehicles whereby the gasoline motor and its appurtenances are left out of the chassis and body of the vehicle and an electrical motor bracket is provided fitting an electrical motor directly to the input of the transmission. The structure may also be built into a suitable original chassis and body structure. Batteries are provided in suitable power banks and a motor control element is provided which is operatively connected to the accelerator foot pedal to provide a speed range control over the electrical motors. The transmission remains operative for selected power ranges within the speed range of the motor thereby extending the operating range of an electrically powered vehicle. Unlike direct rheostat controls, the motor controller in the present invention operates solenoids as tripped by limit switches and the solenoids drop resistance from the motor circuit to increase the speed of the electrical motors, and the batteries directly serve the motor at full speed on full depression of the accelerator pedal. The appliances such as lights, windshield wipers, radios and the like are connected to the electrical power supply and are selectively energized. A charger is provided for periodic restoration of battery power.

2 Claims, 8 Drawing Figures

ELECTRIC CONVERSION FOR AUTOMOBILES

BACKGROUND OF THE INVENTION

So far as is known, most attempts to provide an electrically powered vehicle have offered to control both power and speed using rheostatic type controls in regular electrical circuits or in solid state gated circuits. The present invention attempts to provide a range control for speed available in plural increments and a transmission control for selection of power range. Such a structure is believed to best adapt electricity to the problem of driving a vehicle in a manner closest to the present automotive driving techniques and so that electricity is conserved by appropriately adjusting the power output range through the means of a transmission which may be manual or automatic but which is most efficient in the manual type operation. Where adjustments for torque and speed are required from a common control, the demands placed on the controller usually result in compromises in the control so that energy is lost from the system and is not selected in accord with the job at hand. The present invention seeks to combine transmission and separate speed selection in a manner closely similar to existing automobiles so that the user is familiar with mode of operation and so that the most economical use can be made of the stored electrical energy. Accordingly, at start up, a power range (low gear) can be selected and the vehicle started slowly to a selected torque point whereupon the range is shifted up, speed is adjusted and a final cruising power (high gear) is selected and speed adjusted to meet running demands. A clutch is not necessarily required using synchro-mesh gearing available in present-day transmissions. In conversions of internal combustion vehicles to electrical drive it is frequently convenient to continue the use of the clutch. The selection of speed in whatever gear range is accomplished by physically pressing or releasing pressure on an accelerator pedal and in selection of power range using a synchro-mesh transmission, by selection of the proper gear ratio or range. The vehicle can actually be started in any selected gear suitable to the environmental or terrain condition and in substantial relief of starting strain.

Accordingly, the components needed are few for accomplishing a conversion. An electric motor or motors replace the gasoline motor. A controller operating as an accelerator is positioned in the vehicle between the source of power and motors. The source of power is found in storage batteries that are periodically recharged. The motors are drivably connected to the transmission and the transmission is manually or automatically manipulated to select necessary power and gear range. In addition, the present invention provides direct coupling of the motor to the input shaft of the transmission assuring proper alignment and solid mounting. The electrical drive circuit is separated from the ignition and electrical harness of the vehicle except that the headlamps, and electrical accessories may draw power from the common source.

The prior art is well represented by the U.S. Pat. No. 3,190,387 to Douglas Dow, showing a direct powered electric motor vehicle; the U.S. Pat. No. 1,017,150 to Edward M. Holme for a crane controller; the U.S. Pat. No. 3,241,019 to Arthur R. Gross for a control system for electric vehicles; U.S. Pat. No. 3,517,290 to Peter Funsser for a solid state control element for electrical vehicles; and U.S. Pat. No. 3,514,681 to Hans Reinbech and Walter Dorn.

Hence, the principal object of the present invention is to provide a new and improved battery powered electric motor driven passenger vehicle and in particular to provide a structure of such compactness that conversion of existing small internal combustion engine vehicles is relatively simple. Another object is to show a new and simplified electric controller structure for electrically powered vehicles working in combination with a transmission. The ancillary objective is the presentation of a conversion package which is simple to make and possesses components that are economical in themselves and easy to maintain or replace.

Other objects including miniaturization, reduction of weight, rechargeability, and smooth performance modeled after conventional internal combustion engine operations will be apparent as the description proceeds.

GENERAL DESCRIPTION

In general, the conversion of a vehicle formerly powered by an internal combustion engine to an electric powered vehicle in accord with the present invention starts with the removal of the internal combustion engine and the substitution therefor of direct current electrical motors. In the present invention the motors are drivably coupled to the input side of the existing transmission and if the vehicle never possessed an internal combustion engine, then the practice of the invention is started by connecting a support bracket to the transmission, securing the electrical motor or motors to the input shaft as by a spline or the like and securing the motor or motors to the bracket. In this manner, torque ranges are capable of being selected by utilization of the transmission and if the transmission is of synchro-mesh type, the clutch may be eliminated. However, it is also possible to continue to use the existing clutch and, of course, the hydraulic or mechanical brakes and even the accelerator pedal is left intact. The accelerator pedal is linked to a motor controller having an actuator arm and plural micro switch stations. The micro switches energize relays or solenoids which selectively delete or add resistance between the batteries and the motor or motors. The space required for the electrical motors is substantially less than that required for the internal combustion engine. This arrangement wholly avoids previously common rheostat contacts which wear and cause constant difficulty with substantial resistance loss or variance arising under heavy loads and the like. These micro switches pilot-operate a plurality of solenoids in banks which result in elimination of resistance in the control to the motor or motors. The energy is supplied by a plurality of batteries framed in banks, as for example, three 12 volt batteries per bank or six 6 volt batteries series wired for production of 36 volts and located, for example, in a rack provided behind the rear seat of a vehicle and between seat and fire wall. A low voltage battery, for instance a 12 volt source, as indicated, provides pilot voltage for the solenoid operation in the speed controller and power for lights and accessories connected (without major overhaul of the wire harness) in existing vehicles and at top speed the motors are directly fed from the batteries. The wiring, as will be seen, assures long solenoid life since resistance is reduced to an absolute minimum and all bus bar connections feed directly to the motors at full speed. Where power requirements vary within a particular selected speed, the appropriate transmission ratio is selected to adjust torque to speed. This provides a flexibility previously unknown in most electrical vehicle applications and adapts the power condition to the widest variety of environmental necessities. The examples are in hill climbing, special traction requirements and in use of engine braking characteristics. As thus described, the resulting converted vehicle or new vehicle possesses the same driving "feel" as if an internal combustion engine powered the vehicle and the choices and power options to the driver are comfortable and natural.

In kit form, the conversions include a solenoid bus board element in which bus connections and resistors are pre-wired; a controller linkage to the accelerator pedal and an attached switching complex with actuator arm moved by the linkage from the accelerator pedal; a motor-bracket assembly attachable directly to the transmission, a recharger connection whereby the batteries can be repowered as necessary; and a power pack comprising batteries and holders therefor. The ignition switch preconditions the motor controller for start on pressing the accelerator pedal and with or without clutches the driver can select the drive gear ratio suitable to driving needs. Connection to the accelerator pedal by the linkage places the foot in control over the motor and the control is available through the pilot lines only when the ignition switch is closed. A battery charger, operable from 120 A.C. household voltage accomplishes recharging of the batteries as desired. In testing, the operation of the vehicle has been smooth, economical, and relatively trouble-free using a pair of 36 volt series wound motors hooked in parallel and rated at 2½ horsepower each. Power was from power packs providing 36 volts from batteries of industrial type (Gould) having 220 ampere hours of capacity. Earliest testing achieved the 36 volts using six 6 volt batteries connected in series. Then twelve 6 volt batteries were employed. Performance was doubled, despite the added weight, when two packs thus wired were placed in parallel. On a small vehicle chassis and body (Volkswagen) (approximately 2,250 pounds with motor and batteries) the top speed of 45 miles per hour could be achieved with easy cruising at 35 miles per hour for a distance of about 30 miles under average road conditions between charges.

IN THE DRAWINGS

FIG. 1 is a somewhat schematic profile view of a small vehicle converted to battery powered operation in which the electric motor is coupled directly to the input of the transmission and speed control is accomplished by depressing the accelerator pedal which actuates a control circuit which drives the motors from a bank of batteries located adjacent the fire wall of the vehicle. All controls may be located in the space normally allocated to the internal combustion engine and the components are preferably clustered for easy service and replacement.

FIG. 2 is a top plan (somewhat schematic) view of the vehicle shown in FIG. 1 and indicating the use of the existing transmission and braking.

FIG. 3 is a schematic elevation view showing the accelerator pedal connected by a link to selectively move an actuator arm which successively closes micro switches to actuate solenoids which, on firing, progressively remove resistance from the line between batteries and motor so that with full pedal depression the batteries feed directly to the motor thus conserving the solenoids because all switches are closed at full pedal.

Figure 6:
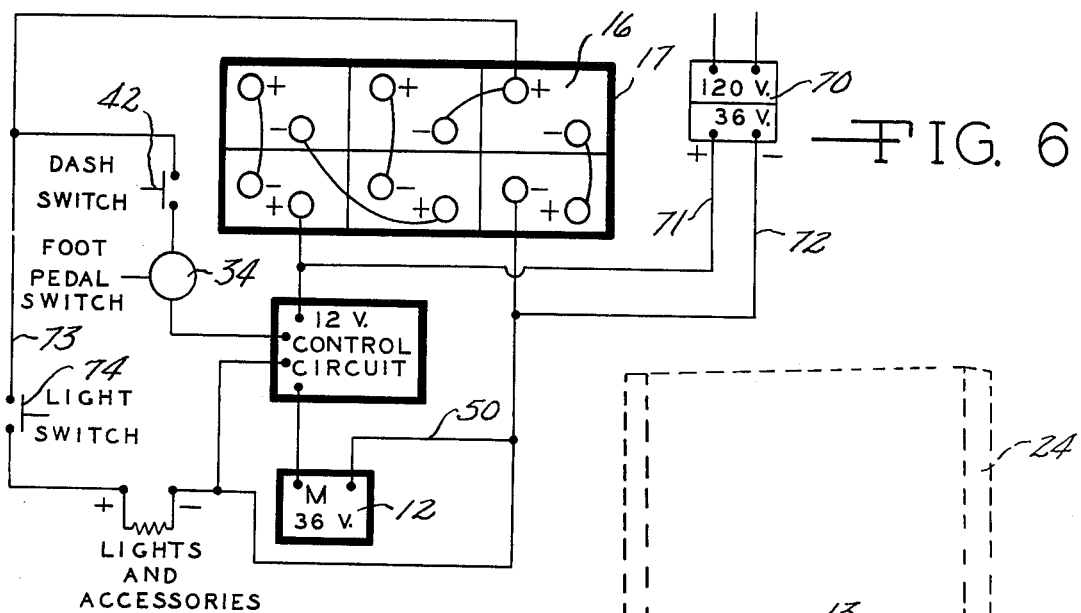

FIG. 6 indicates the batteries nested in a battery holder and connected to the recharger and speed controller and thence to the motors. The pilot line of 12 volts is shown which serves lights and accessories and is broken by the ignition switch.

Figure 7:
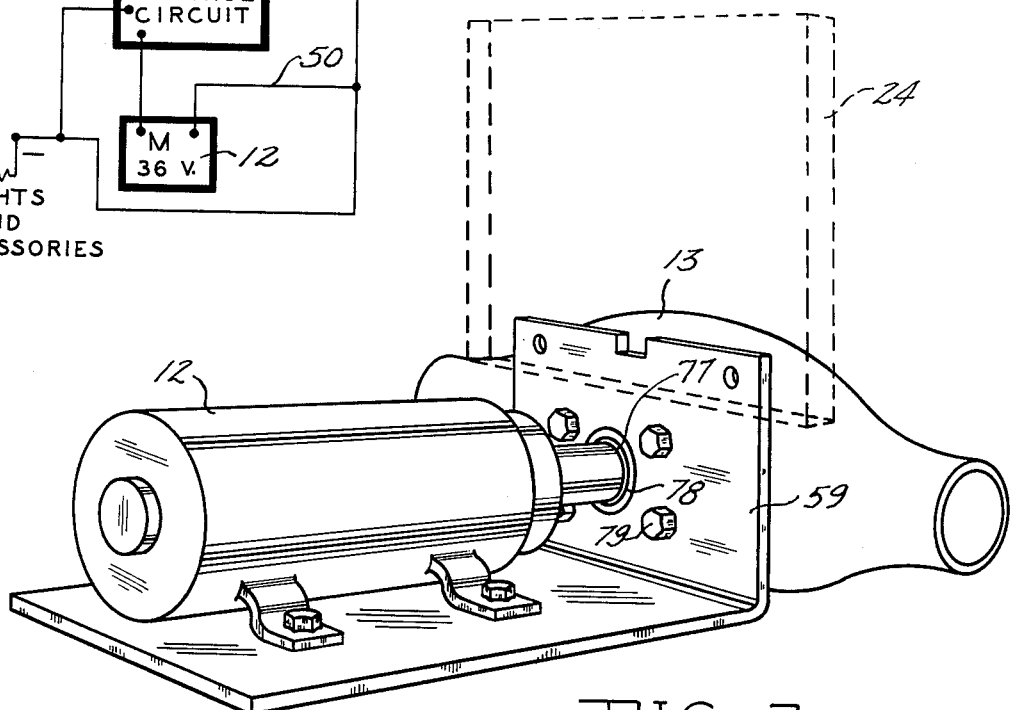

FIG. 7 is a partial perspective view showing an electric motor directly coupled to the transmission at the input thereof and the motor supported by a simple motor bracket which also supports the base for the main line bus connections and solenoids.

Figure 8:
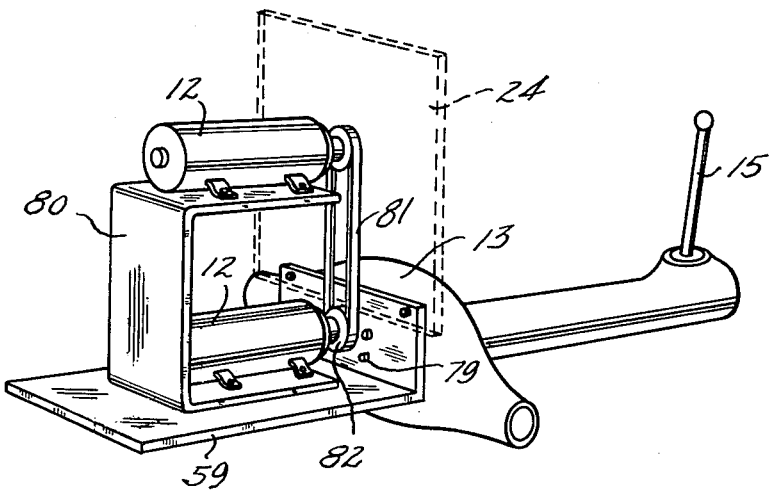

FIG. 8 is a partial perspective view of a plurality of motors supported by a bracket bolted to the transmission and the motors being drivably connected for integration of driving power to the transmission. The base for the main line bus bar connections and solenoids is secured to the bracket and extends therefrom.

SPECIFIC DESCRIPTION

Figure 1:
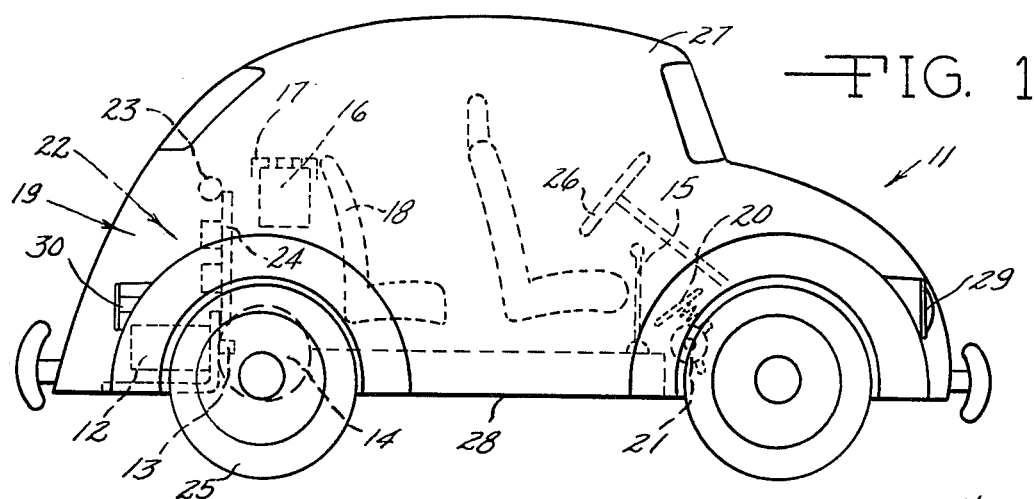

Referring to the drawings and in particular to the FIG. 1 thereof, a vehicle 11 is shown converted from an internal combustion engine type to an electrically driven type. The simplicity of the conversion is appreciated since the electric motor 12 is directly coupled to the input of transmission 13 indicated on the differential housing 14 and gear selection is accomplished in the structure by the gear shift knob or handle 15. The batteries 16 are located in a rack 17 behind the rear seat 18 and the fire wall or partition separating the interior of the vehicle 11 from the motor compartment 19. It will be appreciated that batteries 16 can be variously positioned in the vehicle 11 in accord with desired weight distribution and to assure best stability and lowest center of gravity. The accelerator pedal 20 is retained in position but is connected to a motion translation element 21, which (as will be seen) is operably connected to a motor controller best appreciated in FIGS. 3 and 6 and which comprises a switch bank and solenoid bank 22. The solenoids 22, obeying the commands of the switches acted on by the accelerator pedal 20 selectively delete or add the plural resistances 23 to the drive circuit to the motor or motors 12. The electrical components and bus bars will be seen as mounted on a mounting board 24 which may be a part of the fire wall or compartment divider or may be a separate heavy panel of insulation material as shown. The wheels 25 are driven by the transmission 13 and differential 14 thus propelling the vehicle 11. The steering linkage operated by the steering wheel 26 is unaltered and the body 27 and its chassis or frame 28 is conventional. The usual accessories such as headlamps 29, taillamps 30, window wipers, washers, power brakes, power steering, power window operators, interior lights, cigarette lighters, electrical heaters and the like are present in the vehicle 11 and are operated by power from the batteries 16.

Figure 2:
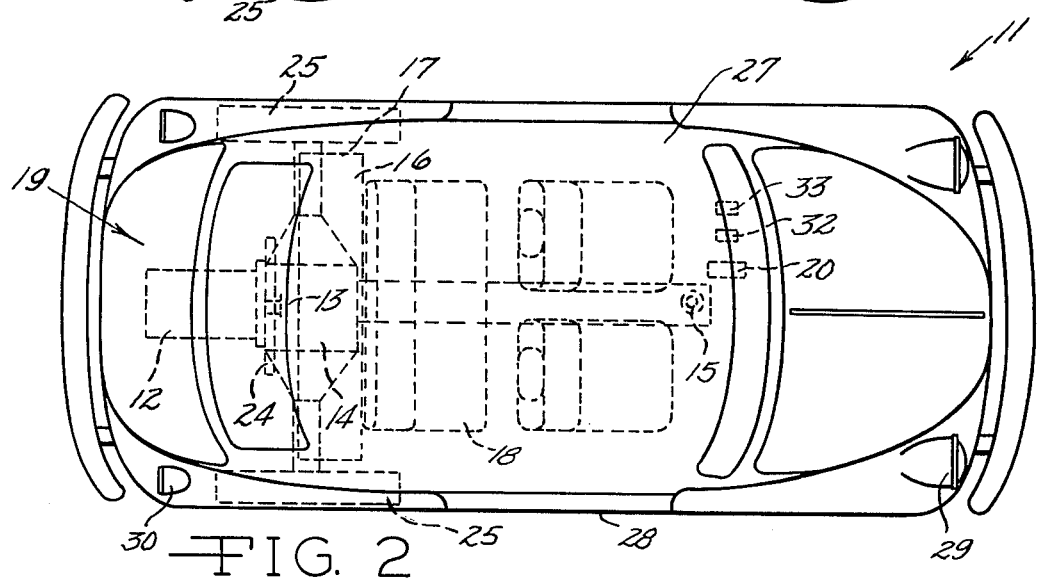

In the FIG. 2, the structure of FIG. 1 is given generally better identification and the brake pedal 32 and clutch 33 are seen in the vehicle 11 as they remain after conversion of the vehicle 11 to electrical drive.

Figure 3:
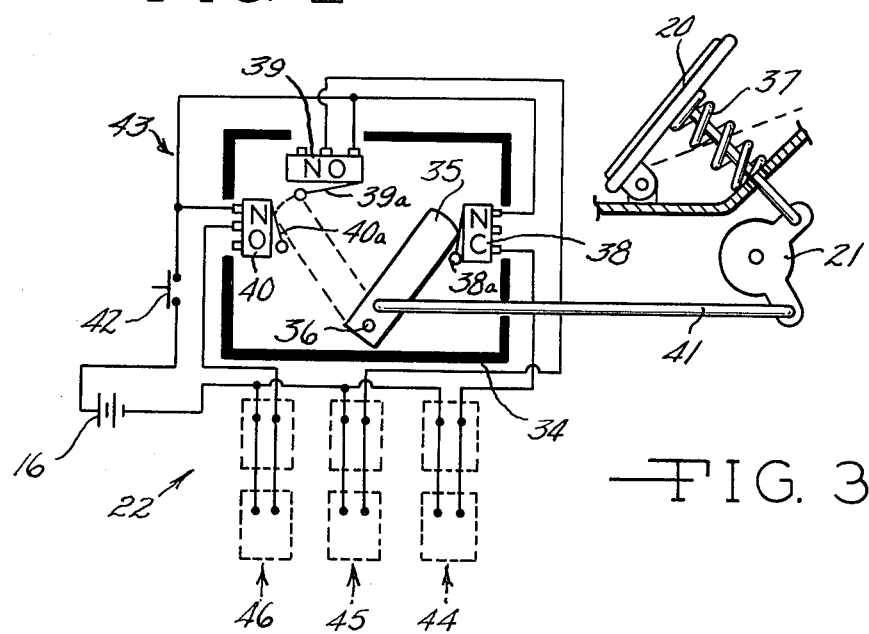

In the schematic FIG. 3 the switch control box 34 is seen with the actuator arm 35 connected to the motion translator element 21 and pivotal on the journal 36 in accord with the movement of the accelerator pedal 20. The pedal 20 is biased by spring 37 to the full line position shown and when the pedal 20 and spring 37 are depressed to the phantom-line position corresponding arcuate motion occurs in arm 35 in box 34 and selectively and sequentially tripping the switches 38, 39 and 40. The connecting rod 41 between the motion translator 21 and arm 35 effectively transmits the motion of the pedal 20 to the arm 35 and the arm 35 is returned to its position against the switch 38 as shown in full line when pressure is released on the pedal 20. The dash switch 42 must be closed to energize the pilot circuit 43 connected to the switches 38, 39 and 40 and to the solenoid bank 22. The battery 16 indicates the source of pilot power controlling the solenoids 44, 45 and 46 as shown. While the pedal 20 is shown acting through the motion translator 21 and connecting rod to the remotely positioned arm 35 in box 34, the box 34 may be directly acted on by the pedal 20 and in such instances the pilot voltage is conducted to the solenoids bank 22. As illustrated, the pilot lines are kept to minimum length by locating the box 34 adjacent the motor 12.

The switch 38 is a normally closed switch and the arm 35, as shown, holds the switch 38 in an open position in depression of the actuator lever 38a. Accordingly, the switch 38 closes when the arm 35 moves counterclockwise as seen in the FIG. 3. This fires the parallel wired solenoids 44. Continued counterclockwise motion of the arm 35, induced by further depression of the pedal 20, causes the normally open switch 39 to be closed and thereupon firing the parallel wired solenoids 45 while the solenoids 44 remain in the energized position. Further motion in the arm 35 results in depression of the actuator arm 40a of the switch 40 and continued depression of the actuator arm 39a of the switch 39. Accordingly, the normally open switch 40 is closed by the arm 35 and this fires the parallel wired solenoids 46. Under this condition all solenoids 44, 45, and 46 are energized by pilot voltage and, as will be seen, all imposed resistance (48 and 49) is removed between the batteries 16 and motor 12. Full power reaches the motor 12 at full depression of pedal 20. The successive application of energy applied to the motor 12 via the switches 38, 39 and 40 acting on corresponding solenoids 44, 45 and 46 results in the gradual increase in speed in power increments resulting from removal of resistance while all of the bus bars are available to reduce system resistance in the controller and no rheostat contact is required.

Figures 4, 5:
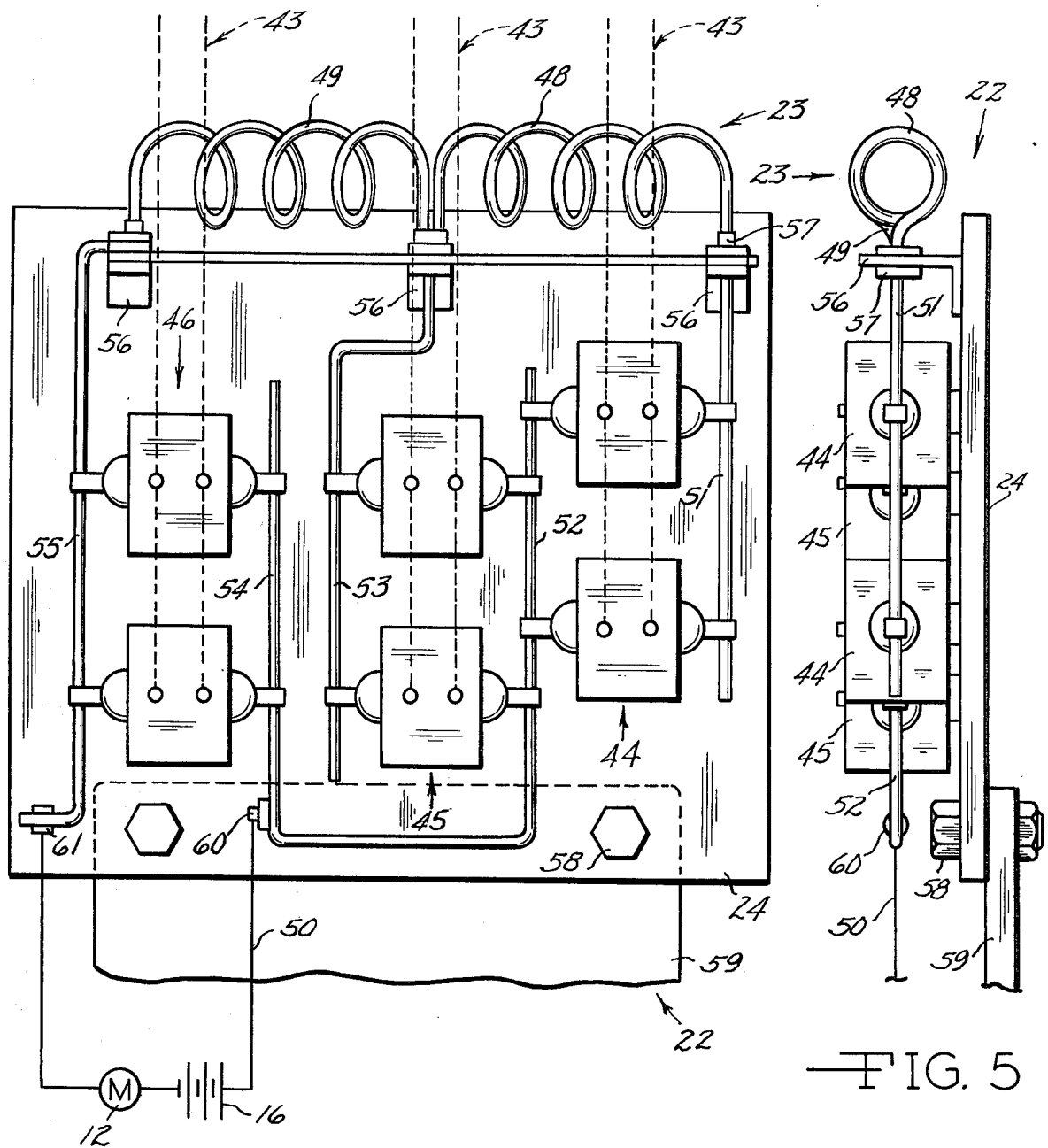
FIG. 4 shows the bus board in elevation view with six solenoids served in pairs by the pilot lines as shown in FIG. 3.
FIG. 5 is an end elevation view of the structure in FIG. 4 and showing the bus connection on the base mounting panel and connected to the motor bracket.

In FIG. 4 the solenoids 44, 45, and 46 are shown in control of the resistance coil elements 48 and 49, both resistances 48 and 49 are operative under the closed condition of switch 38. Closure of switch 39 and energization of the solenoids 45 shunts out the resistance 48 leaving the resistance 49 in the motor circuit, 50. "Flooring" of the pedal 20 or full depression results in closure of the switch 40 and energization of the solenoids 46 and since switches 38, 39 and 40 are now closed, so all solenoids 44, 45, and 46 are energized and the low resistance heavy bus elements or conductors 51, 52, 53, 54, and 55 feed current directly through the circuit 50 to the motor 12 from the batteries 16 and shunting out all resistance in coils 48 and 49. As the depressed pedal 20 is allowed to return under the influence of the spring 37, the resistances 48 and 49 are successively restored providing a speed reduction in stages or increments which results in a braking type function on the motor 12. The pilot voltage circuit 43 is indicated as connected to the posts of the solenoids 44, 45 and 46 by the hidden edge lines in FIG. 4. The circuit board 24 provides mounting means for the solenoid units 44, 45, and 46 and for the mounting brackets 56 which support the resistance elements 48 and 49. These solenoids 44, 45, and 46 support the bus bars or conductors 51, 52, 53, 54 and 55 and the insulating sleeves 57 isolate the resistance elements 48 and 49 to the conductors 51, 52, 53, 54 and 55 except as desired. The bolts 58 secure the panel 24 to a transmission mounting bracket 59 or an extension thereof and the contacts 60 and 61 connect the panel board electrically to the motor circuit 50. This allows for easy replacement of the solenoid bank 22 and resistance circuitry. The arrangement of elements in the motor compartment 19 assures air cooling of the components for long and trouble-free life. A parallel hook-up of the solenoids has been shown in FIGS. 4 and 5 for a heavy load. It will be appreciated that by extending the bus bar or conductor 51 to contact with the conductor 54 and breaking the conductor 54 ahead of the motor connection 60, then if the solenoids 46 stick in the closed position, the retraction of the arm 35 can still progressively break the motor circuit.

In FIG. 6 the battery bank, the control circuit, the motor, the charger arrangement and the integration to the ignition circuit with accessory control is best appreciated. The batteries 16 are shown in the rack or frame 17 to form a battery bank which is series wired to produce desired voltage (36 volts) for the motor circuit 50 operating through the (12 volt) piloted control circuit. The recharger 70 is connected by lines 71 and 72 to the batteries 16 and is operative when plugged into a common voltage (120 volt AC) supply source. As will be appreciated, the current is rectified where needed and transformed to the voltage of the batteries 16 (36 volts) as shown. The ignition switch or dash switch 42 is shown open and must be closed before the foot pedal switch complex in box 34 can pilot the solenoid bank of controls 22 including solenoids 44, 45, 46 and related resistances 48 and 49. A parallel circuit 73 around the pilot circuit line 43 includes (12 volt) service to lights and accessories as indicated and controlled by suitable switches as the light switch 74. Hence, pilot circuit 43 and light circuit 73 utilizes a selected conventional low automotive voltage while the motor circuit 50 has available to it the higher (36 volt) capability. While 12 volts is indicated, 6 volts, for example, could be tapped satisfactorily from the bank of batteries 16 to serve as pilot current.

In FIG. 7 a motor 12 in accord with the present invention is shown secured to a motor mounting bracket 59 and the motor 12 is thus connected as by a direct coupling means such as a spline 77 to the power input 78 of the transmission 13. The solenoid circuit panel or board 24 is connected to the bracket 59 thus providing a compact and rigid motor and control mounting arrangement. The motor bracket 59 can be a simple angle plate as shown and can be fastened as by the bolts 79 to the transmission 13 or differential 14 housing. The motor 12, when secured to the bracket 59, provides considerable rigidity is readily accessible and can be easily removed for service or repair.

In FIG. 8 a modified arrangement for bracketing of the motors 12 is shown by pig-a-back channel bracket 80 secured to the angle bracket 59 and whereby plural motors are interconnected by V-belts 81 on pulleys 82 on the motor side of the spline connection for selected alternate arrangement of plural motors for driving of the transmission 13, where desired.

There are now two test vehicles, the latest employing the 12 volt pilot system as shown and incorporating the switch controlled solenoids as indicated. Both vehicles have given good service with a cruise range in the twelve battery unit of about 35 miles between charges and at a cruise speed of about 25 to 35 miles per hour and maximum speed at about 45 miles per hour. The conversion using Volkswagen vehicles with internal combustion engines removed was accomplished very quickly using the same splines as employed with the internal combustion engines and with mere removal of motor wiring harness and in retention of existing wiring with integration of the ignition switch in the circuit of the electrical controls here. No special skills were required for the conversion and very little adjustment in driving habits was required. The selection of transmission range materially improves overall performance of the electrical vehicle. Pollution of the air is avoided. Venting of the batteries is desired in avoidance of accumulations of gas. Substantial operating economies have been realized bringing operating energy use to about 0.43 Killowatt hours per mile over about 1,000 miles. The vehicle thus described is not intended as a highway vehicle but for short distance pollution-free operation as a commuter vehicle or town car, for example.

Having thus described an operative embodiment of my invention, those skilled in the art will readily perceive improvements, modifications and changes and such improvements, modifications and changes within the skill of the art are intended to be included herein limited only by the spirit of my hereinafter appended claims.

I claim:

1. An electrically powered vehicle comprising:
   an electrical motor directly connected to a transmission of said vehicle;
   a framed battery pack;
   a plurality of fixed resistances on a circuit board panel and connected to bus conduits;
   a plurality of solenoids selectively closing said bus conduits on energization and by-passing successive of said resistances;
   a plurality of switches arranged in an arcuate path, each controlling said resistances by actuation of said solenoids;
   means moving in an arcuate interference path with said switches to close each of said switches successively as an accelerator foot pedal is depressed, all of said switches thus closed remaining closed until said accelerator foot pedal is retracted whereupon, during depressing, said resistances are successively deleted and during retraction said resistances are successively added;
   wiring from said battery pack delivering full voltage to said motor through said selected removable resistances and reduced pilot voltage to said switches; and
   a recharger electrically connected to said battery pack for periodic recharging thereof.

2. A conversion for internal combustion engine vehicles to electrically powered vehicles comprising the steps of:
   removal of the internal combustion engine from connection to the transmission;
   substitution of an electric motor for said internal combustion engine by connection of said electrical motor directly to the input of said transmission;
   connecting the foot pedal accelerator to an actuator arm movable in an arcuate path to engage a plurality of solenoid controlling switches arranged in an arcuate path in such a manner that on full depression all switches are closed;
   connecting said switches to solenoids which, on closure of said switches, delete successive resistances;
   securing a plurality of electrical storage batteries in a frame secured in said vehicle and wiring said batteries to provide drive current to said electrical motor when said switches are closed and wiring said batteries to provide a low voltage pilot current to said switches in actuation of said solenoids;
   connecting said pilot current to automotive accessories as lights, wipers, heaters, and the like; and
   wiring a battery recharger to said batteries whereby periodic restoration of charge of batteries is accomplished.

* * * * *